US008525382B2

(12) United States Patent
Li et al.

(10) Patent No.: US 8,525,382 B2
(45) Date of Patent: Sep. 3, 2013

(54) ELECTRIC MOTOR HAVING PRIMARY AND AUXILIARY POLES AND BRUSH GEAR

(75) Inventors: Yue Li, Hong Kong (CN); Bao Ting Liu, Shenzhen (CN); Ji Dong Chai, Shenzhen (CN)

(73) Assignee: Johnson Electric S.A., Murten (CH)

( * ) Notice: Subject to any disclaimer, the term of this patent is extended or adjusted under 35 U.S.C. 154(b) by 129 days.

(21) Appl. No.: 12/784,248

(22) Filed: May 20, 2010

(65) Prior Publication Data

US 2010/0295404 A1 Nov. 25, 2010

(30) Foreign Application Priority Data

May 22, 2009 (CN) .......................... 2009 1 0107515

(51) Int. Cl.
*H02K 23/64* (2006.01)
*H02K 17/00* (2006.01)
*H02K 1/00* (2006.01)

(52) U.S. Cl.
USPC .......................... 310/158; 310/172; 310/185

(58) Field of Classification Search
USPC ................. 310/158, 162, 166, 269, 134, 140, 310/141, 142, 144, 145, 149, 173, 184, 185
IPC ............................................ H02K 23/64, 13/00
See application file for complete search history.

(56) References Cited

U.S. PATENT DOCUMENTS

| 3,883,633 | A | * | 5/1975 | Kohler | 310/152 |
|---|---|---|---|---|---|
| 3,909,647 | A | * | 9/1975 | Peterson | 310/156.12 |
| 3,967,827 | A | * | 7/1976 | Lehmann | 369/266 |
| 4,341,971 | A | * | 7/1982 | Tohara et al. | 310/195 |
| 5,045,742 | A | * | 9/1991 | Armstrong et al. | 310/216.069 |
| 5,087,845 | A | * | 2/1992 | Behrens et al. | 310/77 |
| 5,223,761 | A | * | 6/1993 | Larsen | 310/216.059 |
| 5,294,856 | A | * | 3/1994 | Horst | 310/181 |
| 5,742,111 | A | * | 4/1998 | Reed | 310/236 |
| 5,866,964 | A | * | 2/1999 | Li | 310/198 |
| 5,874,795 | A | * | 2/1999 | Sakamoto | 310/156.12 |

(Continued)

FOREIGN PATENT DOCUMENTS

DE 10342906 A1 * 4/2005

OTHER PUBLICATIONS

Machine Translation, DE 10342906 A1, Rotation direction changeover switch for low-wear two-pole universal motor of hand-held tool is separate multipole changeover switch with four poles and connected to exactly four carbon brushes, Apr. 21, 2005.*

*Primary Examiner* — Tran Nguyen
*Assistant Examiner* — Thomas Truong
(74) *Attorney, Agent, or Firm* — Muncy, Geissler, Olds & Lowe, PLLC

(57) ABSTRACT

A motor has a stator having a stator core and field windings. The brush gear includes a plurality of brushes, a rotor including a shaft, a rotor core fixed to the shaft, a commutator fixed to the shaft adjacent the rotor core and rotor windings wound about teeth of the rotor core and connected to the commutator. The stator core has a yoke, 2P primary poles about which the field windings are wound, and 2P auxiliary poles. A control device controls the electrical connection of the field windings and the brushes so that 2P or 4P magnetic poles are selectively formed on the stator core when the field windings are electrified. P is an integer equal to or greater than 1.

16 Claims, 5 Drawing Sheets

(56) References Cited

U.S. PATENT DOCUMENTS

| | | | |
|---|---|---|---|
| 6,713,929 B2 * | 3/2004 | Meyer et al. | 310/216.074 |
| 7,122,933 B2 * | 10/2006 | Horst et al. | 310/216.095 |
| 8,004,141 B2 * | 8/2011 | Jeung | 310/186 |
| 2004/0183308 A1 * | 9/2004 | Xu et al. | 290/52 |
| 2011/0260569 A1 * | 10/2011 | Liu et al. | 310/158 |

* cited by examiner

US 8,525,382 B2

ELECTRIC MOTOR HAVING PRIMARY AND AUXILIARY POLES AND BRUSH GEAR

CROSS REFERENCE TO RELATED APPLICATIONS

This non-provisional patent application claims priority under 35 U.S.C. §119(a) from Patent Application No. 200910107515.0 filed in The People's Republic of China on May 22, 2009.

FIELD OF THE INVENTION

The invention relates to electric motors, and in particular to a universal motor.

BACKGROUND OF THE INVENTION

A single phase series motor is also known as a universal motor as it can operate on either AC or DC power. It is a single phase motor with a commutator whose rotor windings are connected in series with stator windings via brushes. Due to its characteristics of high rotating speed, small size, high starting torque, convenient speed regulation and series excitation, the universal motor is commonly used for driving low power appliances that need a high rotating speed, small size and low weight, such as medical devices, power tools, domestic electric appliances and so on.

A typical known universal motor comprises a stator core which comprises a yoke with a rectangular configuration and two teeth (stator poles) which extend inwardly from two opposing sides of the yoke. Each tooth has a winding wound thereon. When the windings are electrified, only two magnetic poles with opposite polarity are formed on the stator, thereby the range of speed regulation of the motor is small.

SUMMARY OF THE INVENTION

To solve the above problem, the present invention provides an electrical motor comprising: a stator having a stator core and field windings; the stator core comprises a yoke, 2P primary poles on which the field windings are wound, and 2P auxiliary poles, the 2P primary poles and 2P auxiliary poles extend inwardly from the yoke, are alternately arranged in the circumferential direction of the yoke; a rotor having a shaft, a rotor core fixed to the shaft, a commutator fixed to the shaft, and rotor windings wound about teeth of the rotor and connected to the commutator; brush gear having a plurality of brushes arranged to make sliding electrical contact with the commutator; a control device for controlling the electrical connecting state of the field windings and the brushes so that 2P or 4P magnetic poles are selectively formed on the stator when the field windings are electrified, and P is an integer equal to or greater than 1.

Preferably, the motor is a universal motor, and the rotor windings electrically communicate with the field windings via the commutator and the brushes.

Preferably, the brush gear comprises 4P brushes.

Preferably, when each of the 4P brushes is connected with the field windings, 2P primary magnetic poles with a same first polarity are formed at the 2P primary poles and 2P induced magnetic poles with a same second polarity opposite to the first polarity are formed at the 2P auxiliary poles when the field windings are electrified.

Preferably, when only 2P brushes are connected with the field windings, 2P primary magnetic poles are formed at the 2P primary poles when the field windings are electrified wherein the magnetic poles formed at adjacent primary poles have opposite polarity.

Preferably, each pole of the stator core comprises a neck inwardly extending in the radial direction of the motor from the yoke and a pole shoe extending in the circumferential direction of the motor from the neck, the surface of the pole shoe facing to the rotor forms a continuous arc.

Preferably, the distance between the yoke and the pole shoe of each primary pole is greater than the distance between the yoke and the pole shoe of each auxiliary pole.

Preferably, P is equal to 1, 2, or 3.

The advantages of embodiments of the present invention include that 2P or 4P magnetic poles configuration can be selectively formed. Compared with the prior art, the speed regulation range of the motor can be increased greatly by selectively changing the number of poles of the stator.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figures 1, 2:
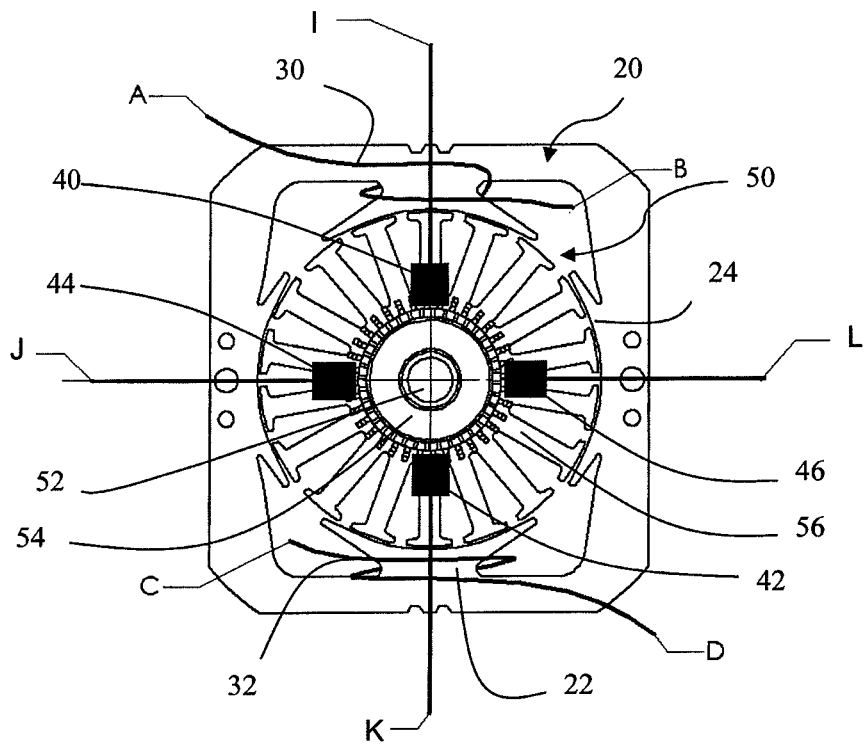
FIG. 1 is a sectional view schematic of a motor according to a first embodiment of the present invention.
FIG. 2 is a view of a control device, electrical contacts of brushes and terminals of field windings of the motor of FIG. 1.

Referring firstly to FIG. 1 and FIG. 2, a single-phase series motor according to the preferred embodiment of the present invention comprises a stator, brush gear and a rotor. The stator comprises a stator core 20, a first field winding 30 and a second field winding 32. The stator core 20 is formed by stacking laminations in the axial direction of the motor and comprises two primary poles 22 and two auxiliary poles 24. The primary poles 22 and auxiliary poles 24 are alternately arranged in the circumferential direction of the motor on an inner side of the stator core facing the rotor 50. The field windings 30, 32 are wound around the primary poles 22 respectively, and no field windings are wound around the auxiliary poles 24. The brush gear comprises four brushes 40, 42, 44, 46. Each brush 40, 42, 44, 46 has an electrical contact I, J, K, L. The electrical connecting state of the terminals A, B, C, D of the field windings 30, 32 and the electrical contacts I, J, K, L of the brushes 40, 42, 44, 46 are controlled by a control device 60.

The rotor 50 comprises a shaft 52, a rotor core 56 fixed on the shaft 52, a commutator 54 fixed on the shaft 52 adjacent the rotor core, and a plurality of rotor windings wound around teeth of the rotor core 56. Terminals of the rotor windings are connected to corresponding hooks of the commutator 54. Current is directed to the rotor windings from the brushes 40, 42, 44, 46 via the commutator 54.

Figure 3:
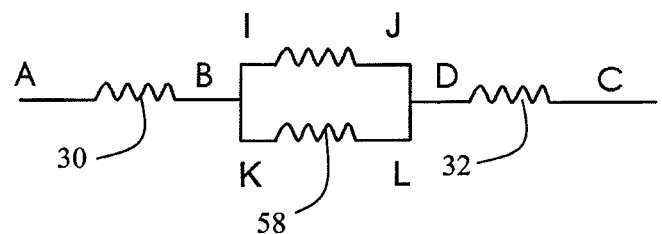
FIG. 3 shows one electrical connecting state of brushes and field windings of the motor of FIG. 1.

In one electrical connecting state as shown in FIG. 3, terminal A of the first field winding 30 is connected to one pole of a power source, terminal B of the winding 30 is connected with the electrical contact I of the brush 40 and the electrical contact K of the brush 42. The electrical contacts J, L of the brushes 44, 46 are connected with terminal D of the second field winding 32, terminal C of the winding 32 is connected the other pole of the power source. Brushes 40, 42 electrically communicate with the other two brushes 44, 46 respectively via the commutator 54 and rotor windings.

Figure 4:
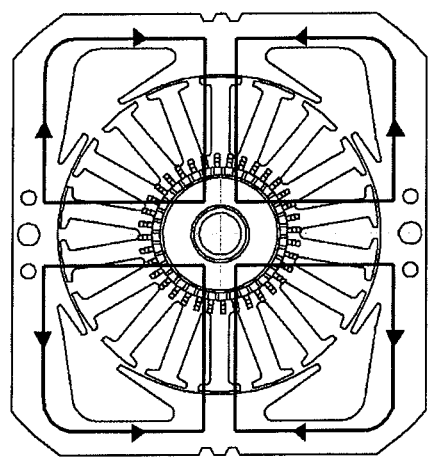
FIG. 4 is a magnetic path diagram of the motor corresponding to the electrical connecting state shown in FIG. 3.

Also referring to FIG. 4, when the motor is in operation in the configuration just described, two primary magnetic poles with the same polarity are formed at the two primary poles 22 by the two field windings 30, 32 and two induced magnetic poles with the same polarity which is opposite to the polarity of the primary magnetic poles are formed at the two auxiliary poles 24. That is, four magnetic poles and four magnetic circuits are formed. Each magnetic circuit passes through a primary pole, the stator yoke, an auxiliary pole, the air gap between the auxiliary pole and the rotor, the rotor and the air gap between the primary pole and the rotor. The electrified rotor windings rotate the rotor 50 by the magnetic field generated by the field windings 30, 32. The motor thus operates in a four pole mode.

Figure 5:
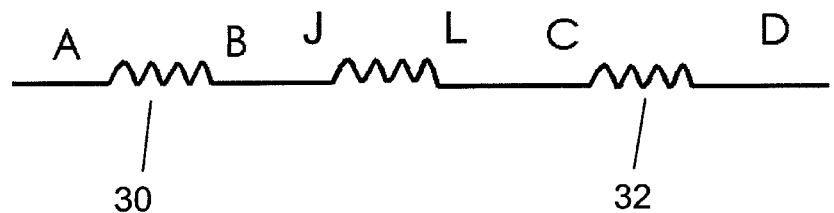
FIG. 5 shows another electrical connecting state of brushes and field windings of the motor of FIG. 1.

In another electrical connecting state as shown in FIG. 5, the electrical contact I of the brush 40 and the electrical contact K of the brush 42 are disconnected from the field windings 30, 32, and terminal A of the first field winding 30 is connected to one pole of a power source. Terminal B of the field winding 30 is connected with the electrical contact J of the brush 44. The electrical contact L of the brush 46 is connected with terminal C of the second field winding 32, and terminal D of the field winding 32 is connected to the other pole of the power source. Brush 44 electrically communicates with the brush 46 via the commutator 54 and rotor windings.

Figure 6:
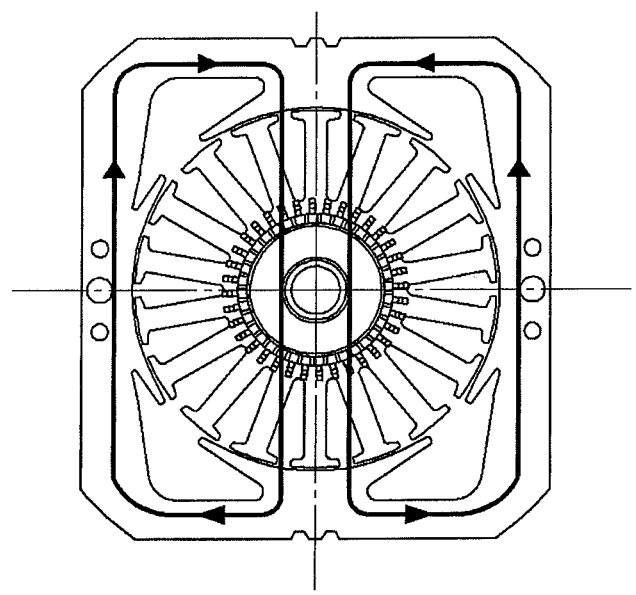
FIG. 6 is a magnetic path diagram of the motor corresponding to the electrical connection relationship shown in FIG. 5.
Figure 7:
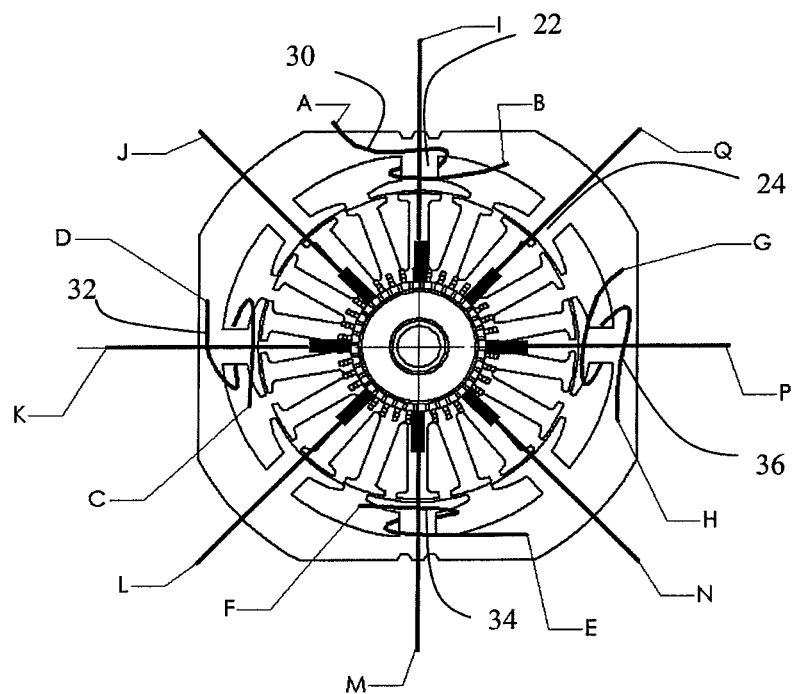
FIG. 7 is a sectional view schematic of a motor according to another embodiment of the present invention.
Figure 8:
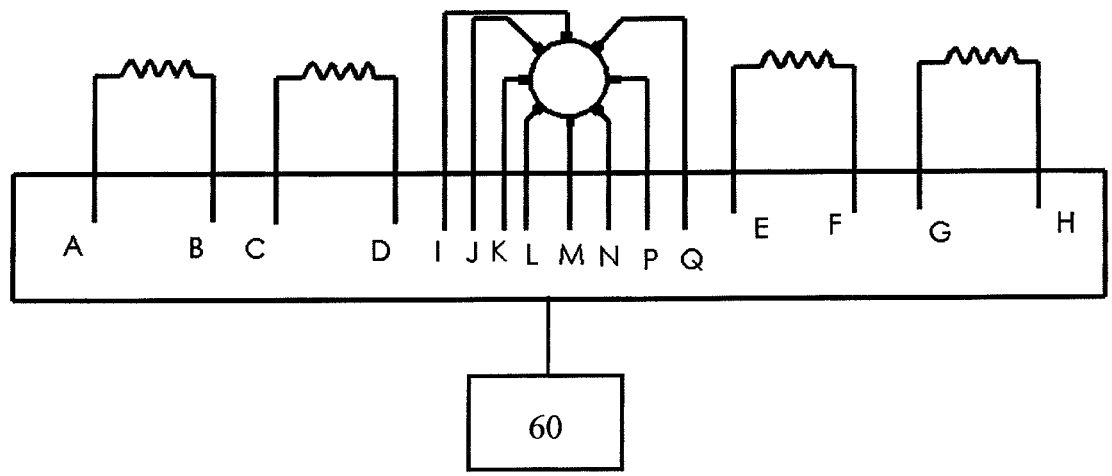
FIG. 8 is a view of a control device, electrical contacts of brushes and terminals of field windings of the motor of FIG. 7.

Referring to FIG. 6, when the motor is in operation in the configuration of FIG. 5, two primary magnetic poles with opposite polarity are formed at the two primary poles 22 by the two field windings 30, 32. Two magnetic circuits are formed. Each magnetic circuit passes through one side of the stator yoke, the two primary poles 30, 32, the rotor 50, and the air gap between the primary poles and the rotor. The electrified rotor windings rotate the rotor 50 by the magnetic field generated by the field windings 30, 32. The motor is thus operated in a two pole mode.

In embodiments of the present invention, the stator core 20 may take a structure of bilateral and the stator cross-section can be round or rectangular, etc. Each pole 22, 24 of the stator core 20 comprises a neck inwardly extending in the radial direction of the rotor from the yoke and a pole shoe extending in the circumferential direction of the rotor from the neck, the surface of the pole shoe facing the rotor forms a continuous arc. The distance between the yoke and the pole shoes of the primary poles 22 is greater than the distance between the yoke and the pole shoes of the auxiliary poles 24. Thus, a large reception space can be formed between the pole shoes of the primary poles 22 and the stator yoke to accommodate the field windings 30, 32.

It should be understandable that the circumferential direction and the radial direction described above are not only for round or cylindrical structures, other shapes such as square and oval are also included within the scope of the present invention.

Figure 9:
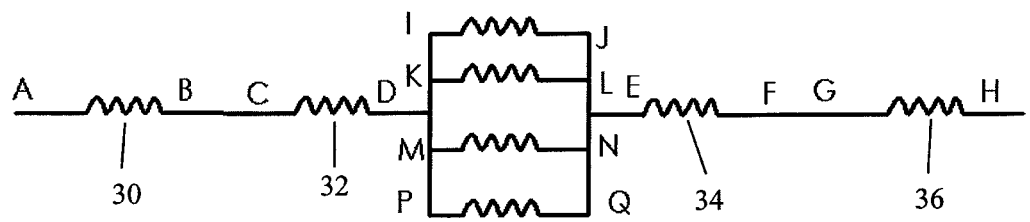
FIG. 9 shows one electrical connecting state of brushes and windings of the motor of FIG. 7.
Figure 10:
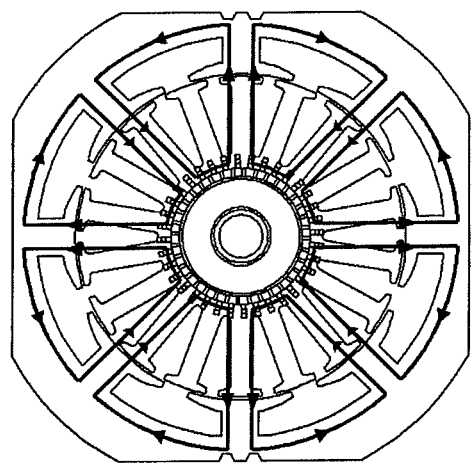
FIG. 10 is a magnetic path diagram of the motor corresponding to the electrical connecting state shown in FIG. 9.
Figure 11:
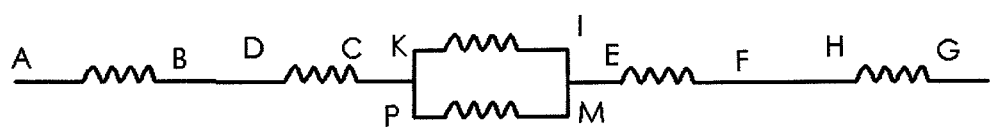
FIG. 11 shows another electrical connecting state of brushes and windings of the motor of FIG. 7.
Figure 12:
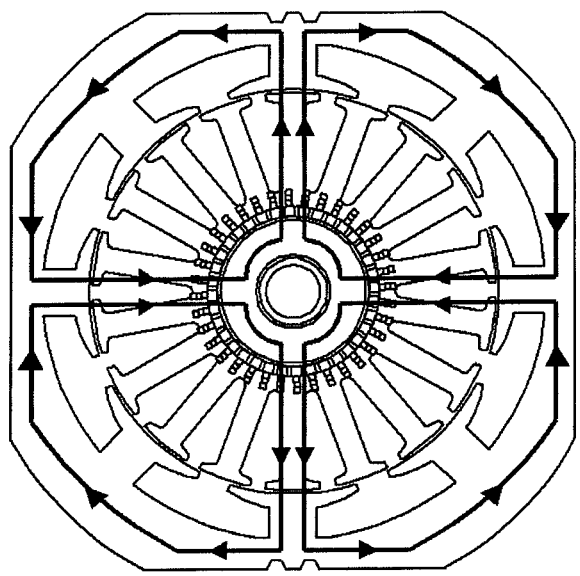
FIG. 12 is a magnetic path diagram of the motor corresponding to the electrical connecting state shown in FIG. 11.

Referring to FIG. 7 to FIG. 11, a single-phase series motor according to another embodiment of the present invention comprises four primary poles 22 and four auxiliary poles 24 which are alternately arranged. Field windings 30, 32, 34, 36 are wound around the four primary poles 22 respectively, and no field windings are wound around the auxiliary poles 24. When the electrical connecting state of terminals A~H of the field windings 30, 32, 34, 36 and electrical contacts I, J, K, L, M, N, P, Q of the brushes is as shown in FIG. 9, eight magnetic circuits and eight magnetic poles as shown in FIG. 10 are formed. When the electrical connecting state of terminals A~H of the field windings 30, 32, 34, 36 and electrical contacts I, J, K, L, M, N, P, Q of the brushes is as shown in FIG. 11, four magnetic circuits and four magnetic poles as shown in FIG. 12 are formed.

In embodiments of the present invention, 2P or 4P magnetic poles can be selectively formed wherein P is an integer equal to or greater than 1. Compared with the prior art, the speed regulation range of the motor can be increased by switching the number of poles of the motor.

It should be understood that although the present invention has been described in detail with above said embodiments, but it is not to limit the scope of the invention. Some other modifications and changes according to the technical solutions and conception of the present invention can be achieved to a person having the ordinary skill in the art and all the modifications and changes are involved in the protected scope of the invention.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while P has been illustrated as being equal to 1 or 2, it may be 3 or more, depending on the motor in question.

The invention claimed is:
1. An electric motor comprising:
a stator having a stator core and 2P field windings; wherein the stator core comprises a yoke, 2P primary poles on which the 2P field windings are wound, and 2P auxiliary poles, and wherein the 2P primary poles and 2P auxiliary poles extending inwardly from the yoke, are alternately arranged in the circumferential direction of the yoke;
a rotor having a shaft, a rotor core fixed to the shaft, a commutator fixed to the shaft, and rotor windings wound about teeth of the rotor and connected to the commutator;

brush gear having a plurality of brushes arranged to make sliding electrical contact with the commutator;

a control device for controlling the electrical connecting state of the 2P field windings and the brushes to selectively form on the stator with 2P magnetic poles via the 2P primary poles, respectively, in one state and 4P magnetic poles via the 2P primary poles and 2P auxiliary poles, respectively, in another state when the 2P field windings are electrified, the connecting state of the 2P field windings and the brushes being changeable by the control device to allow the stator to form different magnetic poles in different states when the 2P field windings are electrified, and P is an integer equal to or greater than 1.

2. The motor of claim 1, wherein the motor is a universal motor, and the rotor windings electrically communicate with the field windings via the commutator and the brushes.

3. The motor of claim 1, wherein the brush gear comprises 4P brushes.

4. The motor of claim 3, wherein when each of the 4P brushes is connected with the field windings, 2P primary magnetic poles with a same first polarity are formed at the 2P primary poles and 2P induced magnetic poles with a same second polarity opposite to the first polarity are formed at the 2P auxiliary poles when the field windings are electrified, and wherein the number of the magnetic poles including the primary magnetic poles and induced magnetic poles is equal to the number of the brushes.

5. The motor of claim 1, wherein each pole of the stator core comprises a neck inwardly extending in the radial direction of the motor from the yoke and a pole shoe extending in the circumferential direction of the motor from the neck, the surface of the pole shoe facing to the rotor forms a continuous arc.

6. The motor of claim 5, wherein the distance between the yoke and the pole shoe of each primary pole is greater than the distance between the yoke and the pole shoe of each auxiliary pole.

7. The motor of claim 1, wherein P is equal to 1 or 2.

8. The motor of claim 1, wherein the stator core comprising the yoke, the primary poles and the auxiliary poles, is made of magnetic conductive material rather than permanent magnet material.

9. An electric motor comprising:
a stator having a stator core and 2P field windings; wherein the stator core comprises a yoke, 2P primary poles on which the 2P field windings are wound, and 2P auxiliary poles, and wherein the 2P primary poles and 2P auxiliary poles extending inwardly from the yoke, are alternately arranged in the circumferential direction of the yoke, a rotor having a shaft, a rotor core fixed to the shaft, a commutator fixed to the shaft, and rotor windings wound about teeth of the rotor and connected to the commutator;

brush gear having 4P brushes arranged to make sliding electrical contact with the commutator;

a control device for controlling the electrical connecting state of the 2P field windings and the brushes so that 2P or 4P magnetic poles are selectively formed on the stator when the 2P field windings are electrified, and P is an integer equal to or greater than 1, wherein when only 2P of said 4P brushes are connected with the field windings, 2P magnetic poles are formed at the 2P primary poles when the field windings are electrified wherein the magnetic poles formed at adjacent primary poles have opposite polarity and the number of the magnetic poles is equal to the number of the brushes connected with the field windings.

10. The motor of claim 9, wherein the motor is a universal motor, and the rotor windings electrically communicate with the field windings via the commutator and the brushes.

11. The motor of claim 9, wherein when each of the 4P brushes is connected with the field windings, 2P primary magnetic poles with a same first polarity are formed at the 2P primary poles and 2P induced magnetic poles with a same second polarity opposite to the first polarity are formed at the 2P auxiliary poles when the field windings are electrified, and wherein the number of the magnetic poles including the primary magnetic poles and induced magnetic poles is equal to the number of the brushes.

12. The motor of claim 9, wherein each pole of the stator core comprises a neck inwardly extending in the radial direction of the motor from the yoke and a pole shoe extending in the circumferential direction of the motor from the neck, the surface of the pole shoe facing to the rotor forms a continuous arc.

13. The motor of claim 12, wherein the distance between the yoke and the pole shoe of each primary pole is greater than the distance between the yoke and the pole shoe of each auxiliary pole.

14. The motor of claim 9, wherein P is equal to 1 or 2.

15. An electric motor comprising:
a stator having a stator core and 2P field windings; wherein the stator core comprises a yoke, 2P primary poles on which the 2P field windings are wound, and 2P auxiliary poles, and wherein the 2P primary poles and 2P auxiliary poles extending inwardly from the yoke, are alternately arranged in the circumferential direction of the yoke;

a rotor having a shaft, a rotor core fixed to the shaft, a commutator fixed to the shaft, and rotor windings wound about teeth of the rotor and connected to the commutator;

brush gear having a plurality of brushes arranged to make sliding electrical contact with the commutator;

a control device for controlling the electrical connecting state of the 2P field windings and the brushes to selectively form the stator with 2P magnetic poles via the primary poles, respectively, in one state and 4P magnetic poles via the primary poles and auxiliary poles, respectively, in another state when the 2P field windings are electrified, and P is an integer equal to or greater than 1.

16. The motor of claim 15, wherein the stator core comprising the yoke, the primary poles and the auxiliary poles, is made of magnetic conductive material rather than permanent magnet material.

* * * * *